United States Patent [19]
Yasohara et al.

[11] Patent Number: 6,020,715
[45] Date of Patent: Feb. 1, 2000

[54] CONTROL DEVICE FOR A BRUSHLESS MOTOR

[75] Inventors: Masahiro Yasohara, Amagasaki; Toshiki Tsubouchi, Kadoma; Hiromitsu Nakano, Hirakata; Toshiaki Seima, Yonago, all of Japan

[73] Assignee: Matsushita Electric Industrial Co., Ltd., Osaka, Japan

[21] Appl. No.: 08/144,017

[22] Filed: Nov. 1, 1993

[30] Foreign Application Priority Data

Nov. 18, 1992 [JP] Japan .................................... 4-308581

[51] Int. Cl.[7] ...................................................... H02P 5/28
[52] U.S. Cl. ........................... 318/808; 318/812; 318/254; 388/815; 388/907.2
[58] Field of Search .................................... 318/254, 138, 318/439, 801–817; 388/812, 911, 809, 815, 823, 822, 907.2

[56] References Cited

U.S. PATENT DOCUMENTS

| | | | |
|---|---|---|---|
| 3,997,825 | 12/1976 | Miyasita et al. | 318/713 |
| 4,446,414 | 5/1984 | Tupper | 318/723 |
| 4,645,991 | 2/1987 | Ban et al. | 318/254 |
| 4,651,067 | 3/1987 | Ito et al. | 318/254 |
| 4,671,389 | 6/1987 | Tanahashi | 318/798 X |
| 4,683,412 | 7/1987 | Bialek et al. | 318/798 |
| 4,958,948 | 9/1990 | Seima et al. | 388/812 |
| 4,987,352 | 1/1991 | Ishii . | |
| 5,122,715 | 6/1992 | Kimura et al. | 318/138 |
| 5,220,634 | 6/1993 | Yaguchi et al. | 318/459 X |

FOREIGN PATENT DOCUMENTS

| | | |
|---|---|---|
| 2538835A1 | 3/1976 | Germany . |
| 3006707C2 | 10/1980 | Germany . |
| 62-100189 | 5/1987 | Japan . |
| 2191048A | 12/1987 | United Kingdom . |
| 2246674A | 2/1992 | United Kingdom . |

Primary Examiner—Brian Sircus
Attorney, Agent, or Firm—Stevens, Davis, Miller & Mosher, L.L.P.

[57] ABSTRACT

A motor driving power supplying section obtains an output voltage by switching-controlling a predetermined voltage outputted from a main power supply and smoothing a voltage thus switching-controlled. A driving transistor group includes a plurality of driving transistors, for supplying electric power based on the output voltage of the motor driving power supplying section to the motor driving coils of multiple phases. A commutation control section supplies conduction switching signals to the driving transistor group so as to switch successive conduction states of the motor driving coils. An output control section controls the output voltage of the motor driving power supplying section so that a collector-emitter voltage of at least one of the plurality of driving transistors included in the driving transistor group has a predetermined value. A torque control section controls conduction current intensity to the motor driving coils by controlling output currents of the plurality of driving transistors included in the driving transistor group.

8 Claims, 6 Drawing Sheets

CONTROL DEVICE FOR A BRUSHLESS MOTOR

BACKGROUND OF THE INVENTION

The present invention relates to a control device for a brushless motor used in OA apparatus, etc. such as a printer, PPC, etc.

Recently OA apparatuses such as printers, PPC's etc. have been divided into two extreme groups, one of them being of popular type pursuing a low price, while the other is of high grade type laying stress on performance. In particular, for high grade type apparatuses, it is desired to improve further performance such as increasing speed, improving in printing quality, reducing of noise, etc. Therefore high performance such as high speed, high controllability, low vibration, low noise, etc. is required for motors mounted on these high grade type apparatuses.

Among these improvements in performance, e.g. if it is tried to increase the speed, the current driving the motor is generally increased. When the current driving the motor is increased, power loss in a motor controlling circuit is also increased, which necessitates a heat evacuating structure. Therefore, there is concern that the motor and the control system therefor will become overly large.

Consequently a control device of low power loss is required for the motor. Heretofore, as example of such a control device, is shown in FIG. 6.

FIG. 6 is a diagram showing the construction of a prior art control device for a brushless motor.

In FIG. 6, reference numerals 101, 102 and 103 are motor driving coils and a capacitor 104, 105 or 106 is connected with one end of each of these motor driving coils 101, 102 and 103, while the other ends thereof are connected in common.

110 and 120 indicate driving transistor groups, which consist of transistors 111, 112 and 113, whose emitters are connected in common and grounded through a resistor 109, and transistors 121, 122 and 123, whose collectors are connected in common, respectively.

The emitters of the transistors 121, 122 and 123 are connected with the collectors of transistors 111, 112 and 113, respectively, and also with the terminals of the driving coils 101, 102 and 103.

107 is a commutation control section, which is constructed so as to output conduction switching signals to the driving transistor groups 110 and 120 so that conduction timing for the driving coils 101, 102 and 103 is optimum with respect to the position of the rotor of the motor.

108 is a speed control section, the output of which is connected with the inverted input terminal of a comparator 130. 140 is an oscillator, which is connected with the non-inverted input terminal of the comparator 130. 150 is a motor driving power supplying section, which is disposed between a main power supply 170 and the collectors of the driving transistors 120, which are connected in common. The output of the comparator 130 is inputted to the motor driving power supplying section 150 so as to control the output voltage thereof.

Operation of the prior art control device for a brushless motor constructed as described above will be explained below.

In FIG. 6, the commutation control section 107 outputs the conduction switching signals to the driving transistor groups 110 and 120 so that conduction timing for the driving coils 101, 102 and 103 is optimum with respect to the position of the rotor of the motor, and in this way the motor is driven with a high efficiency.

On the other hand, the speed control section 108 outputs control signals for controlling the motor so as to rotate it with a constant speed and outputs thereof are compared with triangular oscillation outputs outputted by the oscillator 140 in the comparator 130. Consequently, PWM (pulse width modulation) signals having pulse widths corresponding to the control signal output of the speed control section 108 are outputted by the comparator 130.

A transistor 151 constituting the motor driving power supplying section 150 ON/OFF-switches the main power supply 170 according to the PWM signal output of the comparator 130 and ON/OFF-switching signals thereof are smoothed by an inductance 153 and a capacitor 154.

That is, the output voltage of the motor driving power supplying section 150 is controlled by the PWM signal output of the comparator 130 and as a result the output voltage of the motor driving power supplying section 150 is controlled by the control signal output of the speed control section 108.

Consequently, electric power supplied to the motor driving coils 101, 102 and 103 is controlled so that the motor is controlled so as to be rotated with a predetermined speed.

SUMMARY OF THE INVENTION

However, it is not possible to control rapidly electric power supplied to the motor driving coils 101, 102 and 103 in response to the PWM signal output of the comparator 130 due to time delay in the smoothing circuit by means of the inductance 153 and the capacitor 154 constituting the motor driving power supplying section 150. Therefore, it is extremely difficult to have the motor react rapidly on variations in the load of the motor due to variations in the power supply voltage or various external perturbations and to control the motor so as to maintain a predetermined speed. Therefore, it is impossible to realize high quality control of the motor.

An object of the present invention is to provide a control device for a brushless motor capable of having the motor react rapidly to variations in the load of the motor due to variations in the power supply voltage or various external perturbations, controlling the motor so as to maintain a predetermined speed, and making it possible to realize high quality control of the motor, and at the same time achieving small power loss and making it possible to simplify a heat evacuating structure.

In order to achieve such an object, a device for controlling a brushless motor having motor driving coils of multiple phases according to an aspect of the present invention comprises:

a motor driving power supplying section for obtaining an output voltage by switching-controlling a predetermined voltage outputted from a main power supply and smoothing a voltage thus switching-controlled;

a driving transistor group including a plurality of driving transistors, for supplying electric power based on the output voltage coming from the motor driving power supplying section to the motor driving coils;

a commutation control section for supplying conduction switching signals to the driving transistor group so as to switch successively conduction states of the motor driving coils of multiple phases;

an output control section for controlling the output voltage from the motor driving power supplying section so that collector-emitter voltage of at least one of the plurality of driving transistors included in the driving transistor group has a predetermined value; and a torque control section for controlling conduction current intensity to the motor driving coils of multiple phases by controlling output currents of the plurality of driving transistors included in the driving transistor group.

According to the control device for a brushless motor, it is possible to realize a low current loss and at the same time high quality control characteristics, because it is possible to make at least one driving transistor of the plurality of driving transistors work in an active region extremely close to a saturation region and to control currents supplied to the motor driving coils by the output currents of the driving transistors.

In the control device for a brushless motor described above, the driving transistor group may be conductive only in one direction of the plurality of motor driving coils of multiple phases.

Further, in the control device for a brushless motor described above, the driving transistor group may include a sink side transistor group disposed on the sink side and a source side transistor group disposed on the source side so as to be conductive in two directions of the plurality of motor driving coils of multiple phases. In this case, the sink side transistor group includes a plurality of driving coils, which are a part of the plurality of driving coils described previously, while the source side transistor group includes a plurality of driving coils, which are the remaining part of the plurality of driving coils described previously. In this case, the output control section may control the output voltage from the motor driving power supplying section so that the collector-emitter voltage of the plurality of transistors included in one of the sink side transistor group and the source side transistor group has the predetermined value. Furthermore, in this case, a neutral point control section may be employed, which controls the collector-emitter voltage of the plurality of transistors included in the other of the sink side transistor group and the source side transistor group so that voltage at a neutral point of the motor driving coils of multiple phases described previously has a value corresponding to the output voltage from the motor driving power supplying section.

In the control device for a brushless motor as defined above, as described previously, in the case where the driving transistor group may be conductive only in one direction of the motor driving coils of multiple phases, the driving transistor group may be disposed between the motor driving power supplying section and the motor driving coils of multiple phases. In this case, the plurality of driving transistors included in the driving transistor group may include a main driving transistor supplying electric power based on the output power from the motor driving power supplying section to the driving coils of multiple phases and a preprocessing transistor having the main power supply supplying a driving signal to the main driving transistor. In this case, the source side driving transistor group is disposed between the motor driving power supplying section and the motor driving coils of multiple phases, and the plurality of driving transistors included in the driving transistor group may include a main driving transistor supplying electric power based on the output power from the motor driving power supplying section to the driving coils of multiple phases and preprocessing transistor having the main power supply supplying driving signals to the main driving transistor.

A device for controlling a brushless motor having a motor driving coils of monophase according to another aspect of the present invention comprises:

a motor driving power supplying section for obtaining an output voltage by switching-controlling a predetermined voltage outputted from a main power supply and smoothing a voltage thus switching-controlled;

a driving transistor group including a plurality of driving transistors, for supplying electric power based on the output voltage coming from the motor driving power supplying section to the motor driving coil;

a commutation control section for providing the driving transistor group conduction with switching signals so as to switch successively conduction states of the motor driving coil of monophase;

an output control section for controlling the output voltage from the motor driving power supplying section so that collector-emitter voltage of at least one of the plurality of driving transistors included in the driving transistor group has a predetermined value; and a torque control section for controlling conduction current intensity to the motor driving coils of monophase by controlling output currents of the plurality of driving transistors included in the driving transistor group.

DESCRIPTION OF THE PREFERRED EMBODIMENTS

Hereinbelow is described the control device for a brushless motor according to the present invention, referring to the attached drawings.

Figure 1:
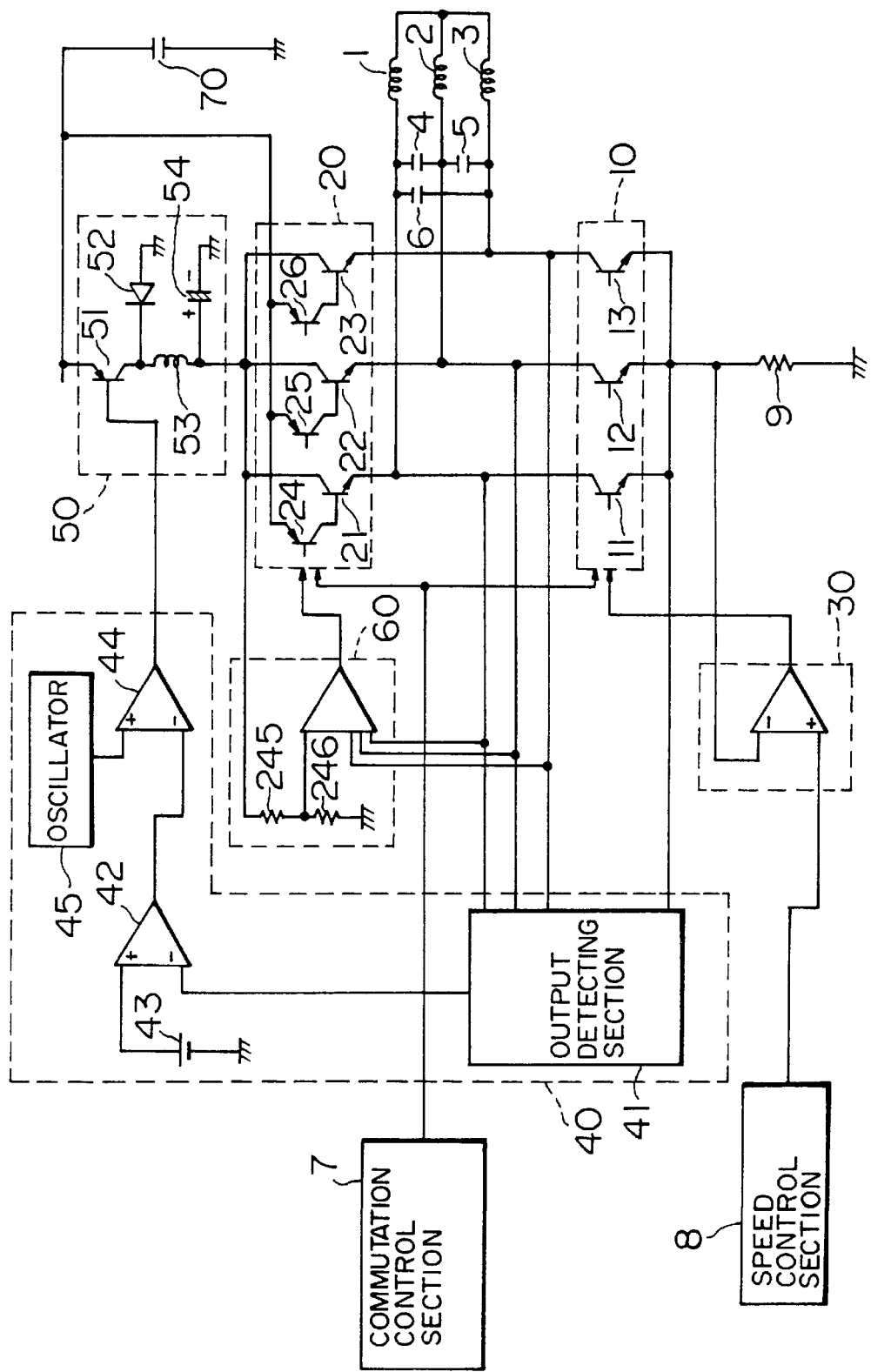
FIG. 1 is a diagram showing the circuit construction of the control device for a brushless motor according to an embodiment of the present invention.

FIG. 1 shows the control device for a brushless motor according to an embodiment of the present invention. A full wave driving system is adopted in the present embodiment.

In FIG. 1, reference numerals 1, 2 and 3 are driving coils for a three-phase motor. The ends on one side of the driving coils 1, 2 and 3 are connected in common and capacitors 4, 5 and 6 are connected between the other ends thereof. The driving transistor groups are denominated by reference numerals 10 and 20.

Particularly, 10 represents the sink side driving transistor group consisting of transistors 11, 12 and 13, whose emitters are connected in common and grounded through a resistor 9.

On the other hand, 20 represents the source side driving transistor group consisting of main transistors 21, 22 and 23 and preprocessing transistors 24, 25 and 26 disposed between a main power supply 70 and the base inputs of the main transistors 21, 22 and 23, respectively.

The emitters of the main transistors 21, 22 and 23 are connected with the collectors of the transistors 11, 12 and 13 and also with the ends on one side of the driving coils 1, 2 and 3, respectively.

7 is a commutation control section, which is constructed so as to output conduction switching signals (ON-OFF signals) to the driving transistor groups 10 and 20 so that conduction timing for the driving coils 1, 2 and 3 is optimum with respect to the position of the rotor of the motor. Since the construction of the commutation control section 7 is well-known, explanation thereof will be omitted.

30 is a torque control section, to which torque command signals from the speed control section 8 are inputted through a first input terminal and motor driving current detection signals produced across the resistor 9 are inputted through a second input terminal. An output of the torque control section 30 acts on the bases of the driving transistors 11, 12 and 13 in the driving transistor group 10, and it is connected therewith so as to control output currents of the driving transistor group 10. A speed control section 8 includes, as is well-known, a speed detecting section for detecting the speed of the motor and a target speed setting section for setting a target speed, although they are not indicated in the figure, to output the torque command signals stated previously as signals corresponding to deviations between the detection signal from the speed detecting section and the setting signal from the target speed setting section.

40 is an output control section, which is composed of an output detecting section 41 for detecting collector-emitter voltages of the driving transistors 11, 12 and 13 in the driving transistor group 10, an amplifier 42 for amplifying difference voltages between the output of this output detecting section 41 and the output voltage of a reference voltage source 43, and a comparator 44 for comparing the output of the amplifier 42 with a triangular oscillation output voltage outputted by an oscillator 45.

50 is a motor driving power supplying section, which is disposed between the main power supply 70 and the collectors connected in common of the main driving transistors 21, 22 and 23 constituting the driving transistor group 20.

The output of the output control section 40 is inputted to the motor driving power supplying section 50, and it is constructed so as to control the output voltage thereof.

60 is a neutral point control section, which is constructed, in the present embodiment, so as to control base inputs to the main driving transistors 21, 22 and 23 constituting the driving transistor group 20 so that collector-emitter voltages of the driving transistors 11, 12 and 13 in the driving transistor group 10 are equal to collector-emitter voltages of the driving transistors 21, 22 and 23 in the driving transistor group 20.

Operation of the control device for a brushless motor indicated in FIG. 1 constructed as described above will be explained.

In FIG. 1, the commutation control section 7 outputs conduction switching signals to the driving transistor groups 10 and 20 so that conduction timing for the driving coils 1, 2 and 3 is optimum with respect to the position of the rotor of the motor, and in this way the motor is driven with a high efficiency.

On the other hand, the speed control section 8 outputs torque command signals to the torque control section 30 as control signals for controlling the motor so as to rotate it with a constant speed, and torque control section 30 controls output current of the driving transistor group 10 so that currents responding to the torque command signals flow through the motor driving coils 1, 2 and 3.

The current flowing through the motor driving coils 1, 2 and 3 is detected in the form of a voltage between terminals of the resistor 9 and the torque control section 30 works so that this voltage is equal to the torque command signal.

Consequently, the motor driving current is controlled directly by the control signal of the speed control section 8, and thus, it is possible to control rapidly electric power supplied to the motor driving coils 1, 2 and 3, which makes it possible to realize high quality controllability.

Further, the output control section 40 is composed of the output detecting section 41, the reference voltage source 43, the amplifier 42, the oscillator 45 and the comparator 44, and operates as described below.

The output detecting section 41 detects the collector-emitter voltage of a transistor, which is in a conduction state, in the driving transistor group 10, i.e. among the driving transistors 11, 12 and 13. In the case where this detection voltage is higher than the output voltage of the reference voltage source 43, the output voltage of the amplifier 42 is lowered.

The output voltage of the amplifier 42 is compared with a triangular oscillation output outputted by the oscillator 45 in the comparator 44, which outputs a PWM (pulse width modulation) signal having a pulse width in accordance with the output voltage of the amplifier 42. When the output voltage of the amplifier 42 is lowered, the PWM signal is one, for which the period, during which the level thereof is high, is longer than the period during which it is low.

When the PWM signal having such a pulse width is inputted to the motor driving power supplying section 50, the OFF period of the transistor 51 constituting the motor driving power supplying section 50 is elongated, and thus the output smoothened by the inductance 53 and the capacitor 54, i.e. the output voltage of the motor driving power supplying section 50, is lowered. When the output voltage of the motor driving power supplying section 50 is lowered, the collector-emitter voltage of the driving transistors 11, 12 and 13 in the driving transistor group 10 is also lowered.

In the case where the detection voltage of the output detecting section 41 is lower than the output voltage of the reference voltage source 43, the collector-emitter voltage of the driving transistors 11, 12 and 13 in the driving transistor group 10 is increased by a process inverse to that described above.

In this way, the collector-emitter voltages of the driving transistors 11, 12 and 13 in the transistor group 10 are controlled by the output control section 40 so as to have the same level as the output voltage of the reference voltage source 43.

Thus, it is possible to realize motor driving control having extremely low loss and small heat production by setting the output voltage level of the reference voltage source 43 so that the driving transistor group 10 works in an active state extremely close to a saturation state.

Further, the neutral point control section 60 controls the collector-emitter voltage of the driving transistor group 20 so that the neutral voltage of the motor driving coils 1, 2 and 3 is at a value responding to the output voltage of the motor driving power supplying section 50, in the present embodiment one-half of the output voltage thereof. In this way, in the present embodiment, it is possible to control the collector-emitter voltage of the driving transistor group 20 so that it is at the same level as the collector-emitter voltage of the driving transistor group 10. However, according to the present invention, the value described above is not restricted to one-half.

Consequently, similarly to the driving transistor group 10, it is possible to drive also the driving transistor group 20 with a low loss.

Further, even in the case where the control of the collector-emitter voltage of the driving transistors by the output control section 40 described previously is delayed in time due to a time constant of the smoothing circuit consisting of the inductance 53 and the capacitor 54 in a transient state such as at starting of the motor or acceleration, deceleration, etc. by a command signal from the speed control section 8, it is possible also to prevent uneven power input to the various driving transistors in the driving transistor groups 10 and 20 and destruction of elements by equalizing the collector-emitter voltages thereof.

Furthermore, the preprocessing transistors 24, 25 and 26 in the source side driving transistor group 20 are disposed between the main power supply 70 and the main driving transistors 21, 22 and 23, respectively, and owing thereto, it is possible to lower the collector-emitter voltage of the driving transistor group 20.

That is, by disposing the preprocessing transistors 24, 25 and 26 between the main power supply and the main driving transistors 21, 22 and 23, respectively, it is possible to raise the base voltages of the main driving transistors 21, 22 and 23 to a level close to the output voltage of the main power supply 70. Consequently it is possible to apply a voltage higher than the output voltage of the motor driving power supplying section 50, which is the collector voltage of the main driving transistors 21, 22 and 23, to the bases thereof to control them. Therefore, it is possible to lower the collector-emitter voltage of the main driving transistors and to realize further lower loss in the driving transistor group 20.

Figure 6:
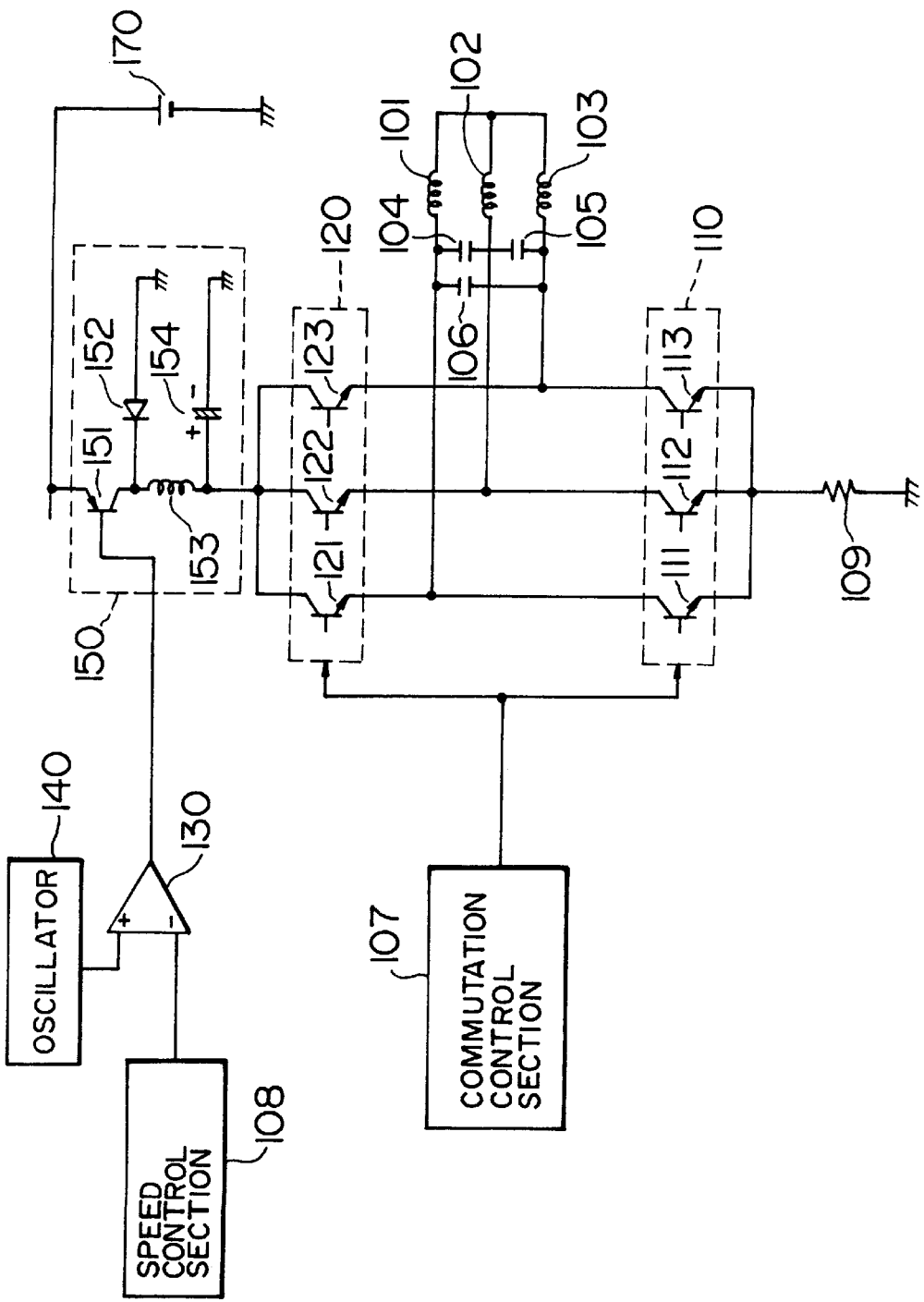
FIG. 6 is a diagram showing the circuit construction of a prior art control device for a brushless motor.

As described above, according to the present embodiment, since there is disposed the torque control section 30 and the control device is constructed so as to control directly the output current of the driving transistor group 10, i.e. driving current flowing through the motor driving coils 1, 2 and 3, in response to the torque command signal of the speed control section 8, the invention avoids the drawbacks of the FIG. 6 prior art system which uses speed control through the motor driving power supplying section, wherein it was extremely difficult to react rapidly on variations in the power supply voltage, variations in the load of the motor due to external perturbations, etc. and to control the motor so as to maintain a predetermined speed. The present invention makes it possible to realize a performance which is very good in the controllability.

Furthermore, by disposing the output control section 40 and by controlling the output voltage of the motor driving power supplying section 50 so that the driving transistor group 10 works in an active state extremely close to the saturation state, it is possible to realize control for driving a motor with extremely low loss and small heat production.

Still further, the present invention not only disposes the neutral point control section 60 making it possible to drive the driving transistor group 20 with low loss similarly to the driving transistor group 10 but also equalizes the collector-emitter voltages in the driving transistor groups 10 and 20 in a transient state such as at starting of the motor or acceleration, deceleration, etc. by a command signal from the speed control section 8, making it possible also to prevent uneven power input to the various driving transistors and destruction of elements.

Still further, by disposing the preprocessing transistors between the main power supply 70 and the main driving transistors in the source side driving transistor group 20, it is possible to realize further lower loss in the driving transistor group 20.

Still further, since the driving transistors work in an active state extremely close to the saturation state, it is easy to control the output currents of the various driving transistors by utilizing base inputs. For example, by varying slowly in time commutation signals for phase-switching of the different driving coils 1, 2 and 3 outputted by the commutation control section 7, it is possible to control currents flowing through the different driving coils at phase-switching so that they vary slowly. In this way, it is possible to suppress surge voltages produced at phase-switching of the different driving coils, to prevent production of noise, and, at the same time, to exhibit excellent performance for lowering vibration and noise of the motor.

An outline of the embodiment indicated in FIG. 1 has been explained above.

Now, different parts of the embodiment indicated in FIG. 1 will be explained in detail, referring to FIGS. 2 to 4.

Figure 2:
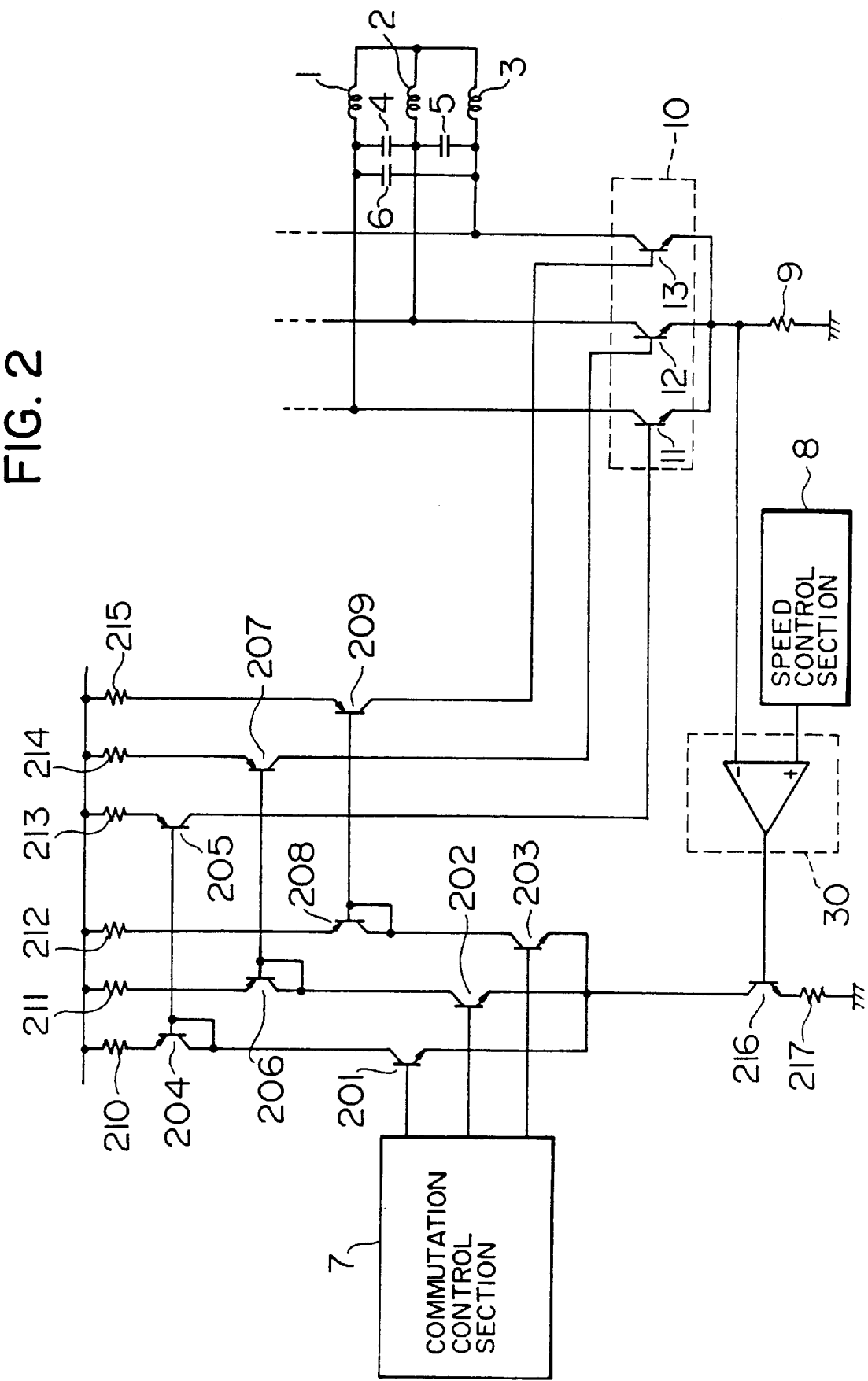
FIG. 2 is a diagram showing an example of the construction of a part of the control device indicated in FIG. 1 in detail.

FIG. 2 shows an example of the connecting construction among the commutation control section 7, the torque control section 30 and the driving transistor group 10. In FIG. 2, 201 to 203 are switching transistors responding to conduction switching signals from the commutation control section 7. Each of a pair of transistors 204 and 205, a pair of transistors 206 and 207, and a pair of transistors 208 and 209 constitutes a current mirror circuit. In FIG. 2, 210 to 215 are resistors. Further, in FIG. 2, 216 is a transistor and 217 is a resistor. The transistor 216 determines current intensity flowing through each of the current mirror circuits. Current corresponding to the output signal of the torque control section 30 is supplied to the base of one of the transistors determined by the conduction switching signal from the commutation switching section 7 in the driving transistor group 10.

Figure 3:
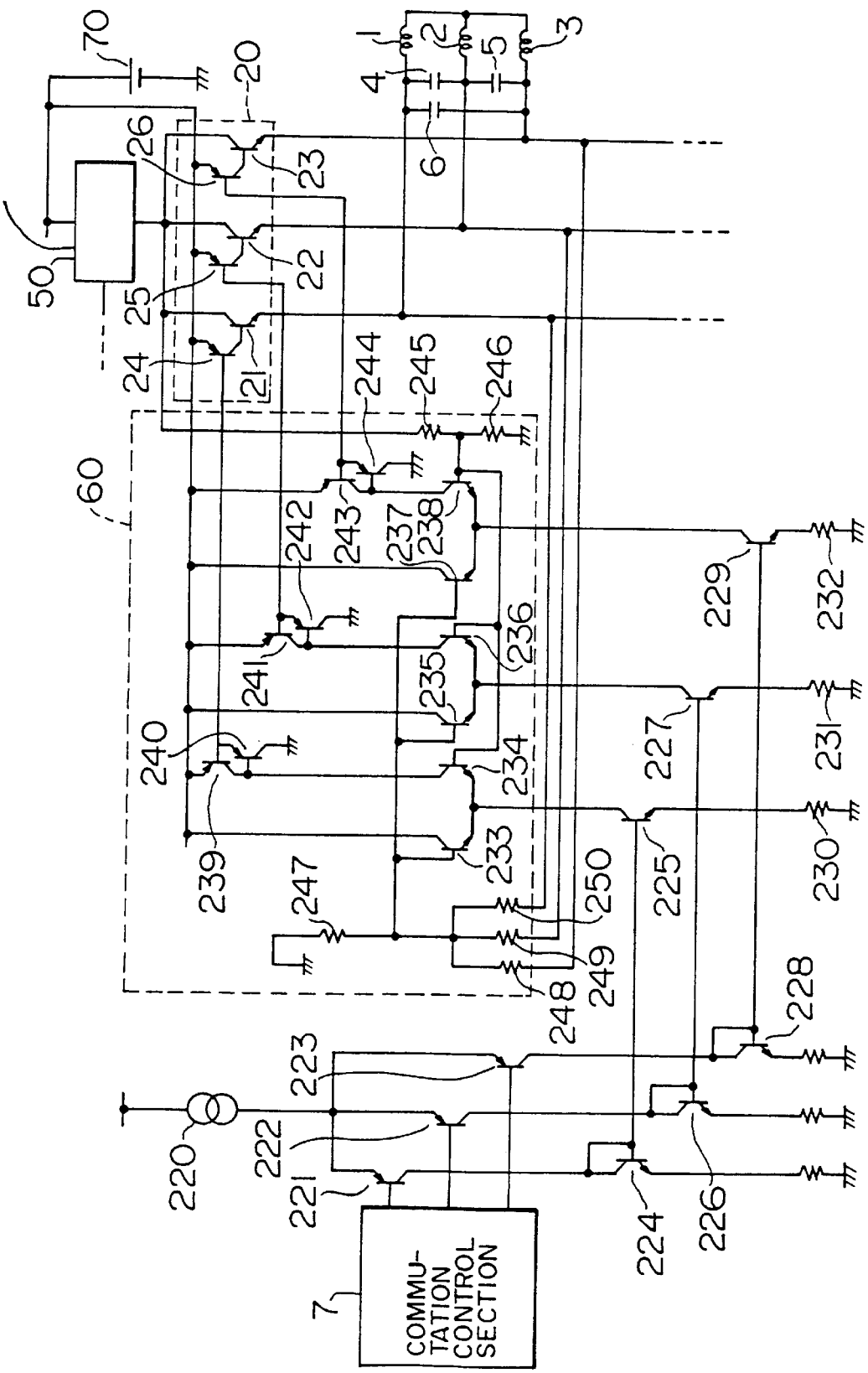
FIG. 3 is a diagram showing an example of the construction of another part of the control device indicated in FIG. 1 in detail.

FIG. 3 shows an example of the connecting construction among the commutation control section 7, the neutral point control section 30 and the driving transistor group 20. In FIG. 3, 220 is a current source. 221 to 223 are switching transistors responding to conduction switching signals from the commutation control section 7. Each of a pair of transistors 224 and 225, a pair of transistors 226 and 227, and a pair of transistors 228 and 229 constitutes a current mirror circuit. 230 to 232 are resistors. Each of a pair of transistors 233 and 234, a pair of transistors 235 and 236, and a pair of transistors 237 and 238 constitutes a differential transistor pair. Each of a pair of transistors 239 and 240, a pair of transistors 241 and 242, and a pair of transistors 243 and 244 constitutes a current output section. 245 to 250 are resistors. According to the circuit indicated in FIG. 3, current such that the voltage at the neutral point of the driving coils 1, 2 and 3 is a voltage corresponding to the output signal of the motor driving power supplying section 50 is supplied to the base of one of the transistors determined by the conduction switching signal from the commutation switching section 7 in the driving transistor group 20.

Figure 4:
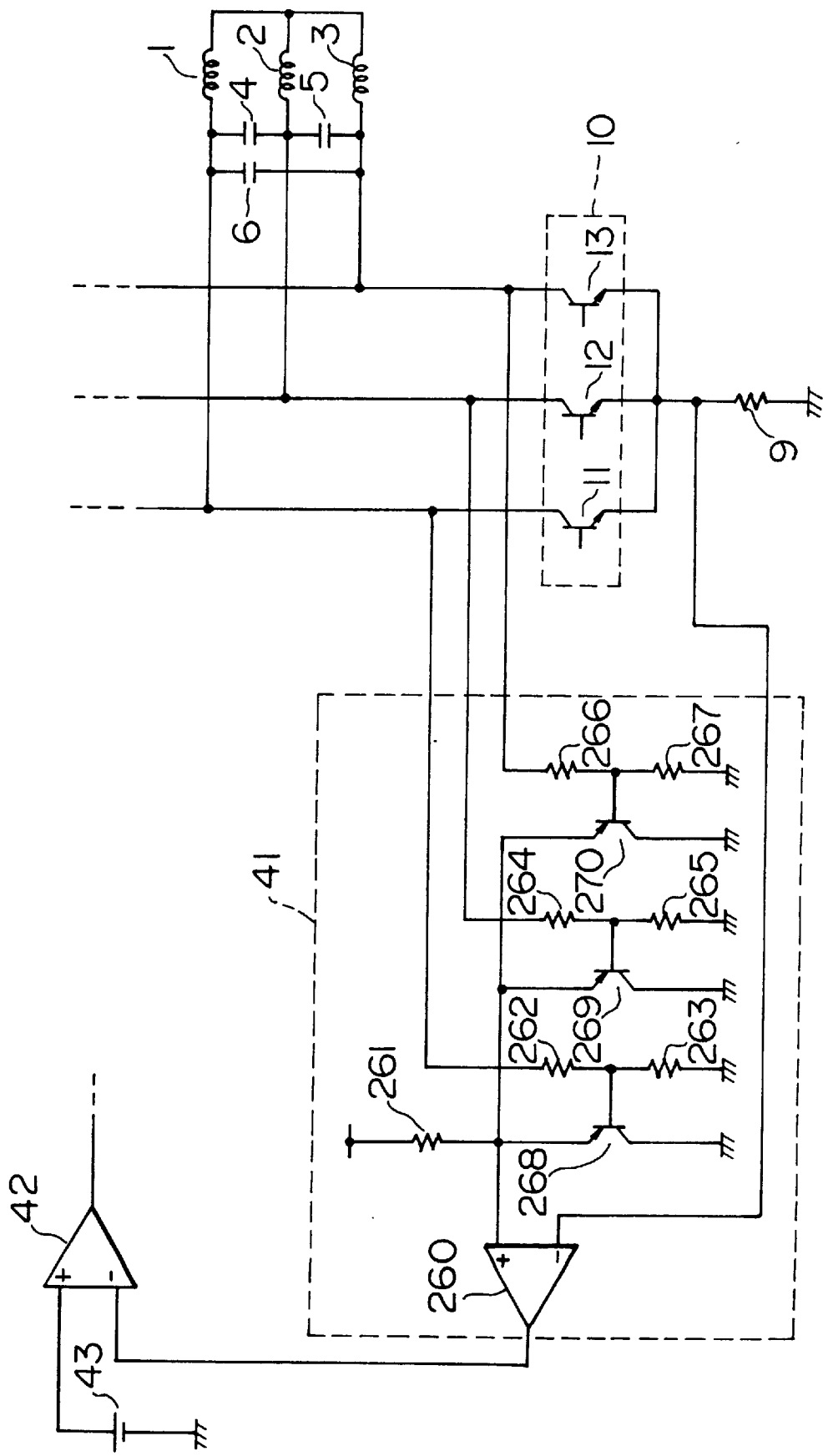
FIG. 4 is a diagram showing an example of the construction of still another part of the control device indicated in FIG. 1 in detail.

FIG. 4 shows a concrete example of the construction of the output detecting section 41 indicated in FIG. 1. In FIG. 4, 260 is a differential amplifier; 261 to 267 are resistors; and 268 to 270 are transistors.

Although the embodiment indicated in FIG. 1 has been explained above, the present invention is not restricted to this embodiment.

For example, the control device may be so constructed that the output detecting section 41 detects the collector-emitter voltage in the driving transistor group 20, while the neutral point control section 60 controls the collector-emitter voltage in the driving transistor group 10.

Further, although the present invention is applied to a brushless motor having 3-phase driving coils 1, 2 and 3 in the embodiment indicated in FIG. 1, it can be applied also to a brushless motor of multiple phases other than 3 phases or a monophase brushless motor.

Figure 5:
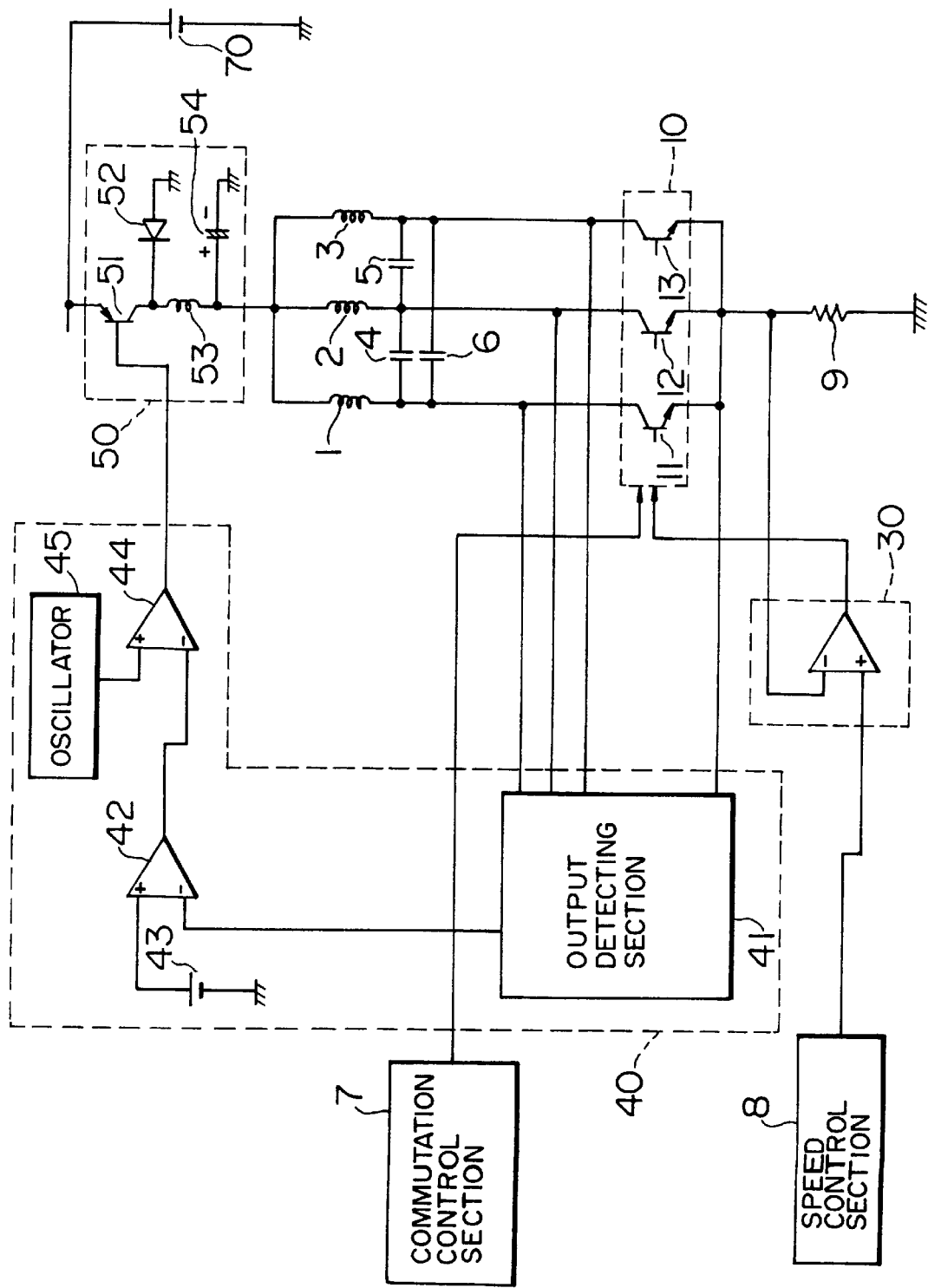
FIG. 5 is a diagram showing the circuit construction of the control device for a brushless motor according to another embodiment of the present invention.

Furthermore, although a full-wave driving system has been adopted in the embodiment indicated in FIG. 1, a half-wave driving system can be adopted in order to realize the present invention. FIG. 5 shows an embodiment in which the half-wave driving system is adopted. In FIG. 5, constructional parts identical to those indicated in FIG. 1 are represented by identical reference numerals and explanation thereof will be omitted. In FIG. 5, the driving transistor group 10 may be disposed between the motor driving power supplying section 50 and the driving coils 1, 2 and 3 and the driving transistor group 10 may consist of a main driving transistor and a preprocessing transistor as the driving transistor group 20 indicated in FIG. 1.

As explained above, according to the present invention, it is possible to realize a control device for a brushless motor capable of (1) reacting rapidly on variations in the power supply voltage, variations in the load of motor due to external perturbations, etc., (2) controlling the motor so as to maintain a predetermined speed, and (3) realizing a performance which is very good in controllability, and (4) achieving a small power loss and a simple heat evacuating structure.

We claim:

1. A device for controlling a brushless motor having motor driving coils of multiple phases, said device comprising:

motor driving power supplying means for being energized by a main power supply and for generating an output voltage in accordance with a control signal;

a driving transistor group, including a plurality of driving transistors, for supplying electric power based on the output voltage of said motor driving power supplying means to said motor driving coils;

commutation control means for supplying a conduction switching signal to said driving transistor group so as to switch successive conduction states of said motor driving coils;

output detecting means for detecting a collector-emitter voltage of at least one of said plurality of driving transistors;

output control means for generating said control signal in accordance with an output signal of said output detecting means to control said output voltage of said motor driving power supplying means so that the collector-emitter voltage of said at least one of said plurality of driving transistors has a predetermined value; and torque control means for controlling conduction current intensity to said motor driving coils by controlling output currents of said plurality of driving transistors.

2. A device according to claim 1, wherein said driving transistor group is conductive only in one direction of said plurality of motor driving coils of multiple phases.

3. A device according to claim 1, wherein said driving transistor group includes a sink side transistor group disposed on a sink side and a source side transistor group disposed on a source side so as to be conductive in two directions of said plurality of motor driving coils of multiple phases.

4. A device according to claim 3, wherein said output detecting means detects the collector-emitter voltage of said plurality of driving transistors included in one of said sink side transistor group and said source side transistor group.

5. A device according to claim 4, further comprising neutral point control means for controlling the collector-emitter voltage of said plurality of driving transistors included in the other of said sink side transistor group and said source side transistor group so that a voltage at a neutral point of said motor driving coils is varied in accordance with said output voltage from said motor driving power supplying means.

6. A device according to claim 2, wherein said driving transistor group is disposed between said motor driving power supplying means and said motor driving coils of multiple phases, and said driving transistor group includes a main driving transistor for supplying the electric power based on said output power from said motor driving power supplying means to said driving coils and a preprocessing transistor, connected to said main power supply, for supplying a driving signal to said main driving transistor.

7. A device according to claim 3, wherein said source side driving transistor group is disposed between said motor driving power supplying means and said motor driving coils, and said driving transistor group includes a main driving transistor for supplying the electric power based on said output power from said motor driving power supplying means to said motor driving coils and a preprocessing transistor, connected to said main power supply, for supplying a driving signal to said main driving transistor.

8. A device for controlling a brushless motor having a motor driving coil of monophase, said device comprising:

motor driving power supplying means for being energized by a main power supply and for generating an output voltage in accordance with a control signal;

a driving transistor group, including a plurality of driving transistors, for supplying electric power based on said output voltage of said motor driving power supplying means to said motor driving coil;

commutation control means for supplying a conduction switching signal to said driving transistor group so as to switch successive conduction states of said motor driving coil;

output detecting means for detecting a collector-emitter voltage of at least one of said plurality of driving transistors;

output control means for generating said control signal in accordance with an output signal of said output detecting means to control said output voltage of said motor driving power supplying means so that the collector-emitter voltage of said at least one of said plurality of driving transistors has a predetermined value; and torque control means for controlling conduction current intensity to said motor driving coil by controlling output currents of said plurality of driving transistors.

* * * * *